(12) United States Patent
Lee et al.

(10) Patent No.: US 9,623,744 B2
(45) Date of Patent: Apr. 18, 2017

(54) POWER TRANSMISSION APPARATUS FOR VEHICLE

(71) Applicant: Hyundai Motor Company, Seoul (KR)

(72) Inventors: Suengho Lee, Seoul (KR); Hyungwook Cho, Ansan-si (KR); Changwook Lee, Suwon-si (KR); Jongsool Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 344 days.

(21) Appl. No.: 14/539,509

(22) Filed: Nov. 12, 2014

(65) Prior Publication Data
US 2015/0183311 A1 Jul. 2, 2015

(30) Foreign Application Priority Data

Dec. 31, 2013 (KR) .......................... 10-2013-0168483

(51) Int. Cl.
| | |
|---|---|
| *F16H 3/44* | (2006.01) |
| *B60K 6/365* | (2007.10) |
| *F16H 3/78* | (2006.01) |
| *B60K 6/48* | (2007.10) |
| *B60K 6/547* | (2007.10) |

(52) U.S. Cl.
CPC ................ *B60K 6/365* (2013.01); *B60K 6/48* (2013.01); *B60K 6/547* (2013.01); *F16H 3/44* (2013.01); *F16H 3/78* (2013.01); *B60K 2006/4816* (2013.01); *Y02T 10/6221* (2013.01); *Y02T 10/6256* (2013.01); *Y10S 903/91* (2013.01)

(58) Field of Classification Search
CPC ....................................................... F16H 3/72
See application file for complete search history.

(56) References Cited

U.S. PATENT DOCUMENTS

| | | | | |
|---|---|---|---|---|
| 6,306,057 | B1 * | 10/2001 | Morisawa | B60K 6/365 475/5 |
| 7,155,994 | B2 | 1/2007 | Gumpoltsberger | |
| 7,383,749 | B2 | 6/2008 | Schafer et al. | |

(Continued)

FOREIGN PATENT DOCUMENTS

| | | |
|---|---|---|
| JP | 2008-18742 A | 1/2008 |
| JP | 2010-149840 A | 7/2010 |

(Continued)

*Primary Examiner* — Derek D Knight
(74) *Attorney, Agent, or Firm* — Morgan, Lewis & Bockius LLP

(57) ABSTRACT

A power transmission apparatus may include: a torque converting device including a first rotation element directly connected to one power source, a second rotation element selectively connected to another power source, and a third rotation element, an input device including a first input shaft directly connected to the third rotation element, selectively connected to the second rotation element, and provided with at least one input gear, and a second input shaft disposed without rotational interference with the first input shaft, selectively connected to the second rotation element, and provided with at least one input gear, a first speed output unit configured to convert toque input from the first input shaft or the second input shaft and output the converted torque, and a second speed output unit configured to convert torque input from the first input shaft or the second input shaft and output the converted torque.

19 Claims, 5 Drawing Sheets

(56) References Cited

U.S. PATENT DOCUMENTS

| | | | | |
|---|---|---|---|---|
| 9,109,682 | B2* | 8/2015 | Lee | F16H 37/046 |
| 9,168,918 | B2* | 10/2015 | Lee | B60W 20/30 |
| 9,463,687 | B2* | 10/2016 | Kaltenbach | B60K 6/365 |
| 2009/0280942 | A1 | 11/2009 | Gumpoltsberger | |
| 2010/0173746 | A1* | 7/2010 | Ideshio | B60K 6/365 477/36 |
| 2013/0337972 | A1* | 12/2013 | Lee | B60W 20/40 477/5 |
| 2015/0167805 | A1* | 6/2015 | Lee | F16H 61/0403 475/5 |
| 2015/0167806 | A1* | 6/2015 | Lee | F16H 61/0403 475/5 |
| 2015/0184732 | A1* | 7/2015 | Lee | F16H 37/046 475/5 |

FOREIGN PATENT DOCUMENTS

| | | |
|---|---|---|
| KR | 10-1338458 B1 | 12/2013 |
| KR | 10-1339248 B1 | 12/2013 |
| WO | WO 2007/042109 (A1) | 4/2007 |

* cited by examiner

FIG. 2

| 변속단 | CL1 | CL2 | CL3 | SL1 | | | SL2 | | SL3 | | Note |
|---|---|---|---|---|---|---|---|---|---|---|---|
| | | | | D1 | N | D4 | D2 | N | D3 | N | |
| Reverse range at EV mode | ● | | | ● | | | | (●) | | (●) | engine OFF, motor ON (negative direction) |
| N | | | ● | | (●) | | | (●) | | (●) | engine ON |
| Forward Starting | | | ● | ● | | | | (●) | | (●) | engine ON |
| First Forward speed | ● | | ● | ● | | | | (●) | | (●) | engine ON |
| Second Forward speed | | ● | ● | | (●) | | ● | | | (●) | engine ON |
| Third Forward speed | ● | | ● | | (●) | | | (●) | ● | | engine ON |
| Fourth Forward speed | | ● | ● | | | ● | | (●) | | (●) | engine ON |
| Forward Range at Ev mode | ● | | | ● | | | | (●) | | (●) | engine OFF, motor ON (positive direction) |

POWER TRANSMISSION APPARATUS FOR VEHICLE

CROSS-REFERENCE TO RELATED APPLICATION

The present application claims priority to and the benefit of Korean Patent Application No. 10-2013-0168483 filed on Dec. 31, 2013, the entire contents of which is incorporated herein for all purposes by this reference.

BACKGROUND OF THE INVENTION

Field of the Invention

The present invention relates to a power transmission apparatus for a vehicle. More particularly, the present invention relates to a power transmission apparatus for a vehicle that may achieve smooth starting and shifting and may improve fuel economy and acceleration performance as a consequence of adding a plurality of power sources and a torque converting device to a double clutch power transmitting apparatus.

Description of Related Art

Environmentally-friendly technique of vehicles is very important technique on which survival of future motor industry is dependent. Vehicle makers are focusing on development of environmentally-friendly vehicles to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

In addition, the vehicle makers promote improvement of efficiency in a power delivery system to meet exhaust regulation of countries and improve fuel consumption performance. To improve efficiency of the power delivery system, the vehicle makers are trying to put an idle stop and go (ISG) system and a regenerative braking system to practical use.

The ISG system stops an engine when a vehicle stops and restarts the engine when the vehicle begins to run. The regenerative braking system operates a generator using kinetic energy of the vehicle instead of braking the vehicle by friction when the vehicle brakes, stores electrical energy generated at this time in a battery, and reuses the electrical energy when the vehicle runs.

In addition, the hybrid electric vehicle is a vehicle using more than two power sources, and more than two power sources are combined in various ways. Typically, the hybrid electric vehicle uses a gasoline engine or a diesel engine driven by fossil fuel and a motor/generator driven by electrical energy.

In addition, one example of a transmission applied to the hybrid electric vehicle is the DCT. According to the DCT, two clutches are applied to a manual transmission layout. Therefore, efficiency and convenience may be improved.

That is, the DCT achieves odd-numbered-speeds and even-numbered-speeds alternately by using two clutches. A mechanism achieving the odd-numbered-speeds and the even-numbered-speeds alternately improves shift feel to solve problems of a conventional manual transmission (MT) and an automated manual transmission (AMT).

However, the DCT has such problems that clutch damage and energy loss due to clutch slip may occur when starting, safety may not be secured since backward rolling due to clutch slip occurs excessively in hill-start, shift shock may be strong compared with an automatic transmission since shift time is controlled to be short due to thermal capacity of a clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a vehicle having advantages of achieving smooth starting and shifting by adding a plurality of power sources and a torque converting device to a double clutch transmission, improving fuel economy by enabling of regenerative braking, and improving acceleration performance by using torque of a motor/generator when acceleration.

A power transmission apparatus for a vehicle according to various exemplary embodiments of the present invention may include: a torque converting device including a first rotation element directly connected to one power source, a second rotation element selectively connected to another power source and configured to output torque of the another power source without rotation speed change, and a third rotation element configured to output the torque of the another power source with rotation speed being changed; an input device including a first input shaft directly connected to the third rotation element, selectively connected to the second rotation element, and provided with at least one input gear fixedly disposed on an exterior circumference thereof, and a second input shaft disposed without rotational interference with the first input shaft, selectively connected to the second rotation element, and provided with at least one input gear fixedly disposed on an exterior circumference thereof; a first speed output unit configured to convert toque input from the first input shaft or the second input shaft and output the converted torque; and a second speed output unit configured to convert torque input from the first input shaft or the second input shaft and output the converted torque.

The one power source may be a motor/generator and the another power source may be an engine.

The motor/generator may include: a stator fixed to the transmission housing; and a rotor rotatably disposed in the stator and directly connected to the first rotation element.

The power transmission apparatus may further include: a first clutch disposed between the second rotation element and the first input shaft; and a second clutch disposed between the second rotation element and the second input shaft.

The power transmission apparatus may further include a third clutch disposed between the engine and the second rotation element.

In one exemplary embodiment, a first input gear may be fixedly disposed on the second input shaft, and second and third input gears may be fixedly disposed on the first input shaft.

The torque converting device may be a double pinion planetary gear set, wherein the first rotation element is a sun gear, the second rotation element is a planet carrier, and the third rotation element is a ring gear.

The first speed output unit may include: a first output shaft disposed in parallel with the first and second input shafts; a first output gear fixedly disposed on the first output shaft and outputting torque of the first output shaft; first and fourth speed gears rotatably disposed on the first output shaft; and a first synchronizer selectively connecting the first speed gear or the fourth speed gear to the first output shaft.

The first speed gear may be engaged with the second input gear and the fourth speed gear may be engaged with the first input gear.

The second speed output unit may include: a second output shaft disposed in parallel with the first and second input shafts; a second output gear fixedly disposed on the second output shaft and outputting torque of the second output shaft; second and third speed gears rotatably disposed on the second output shaft; a second synchronizer selectively connecting the second speed gear to the second output shaft; and a third synchronizer selectively connecting the third speed gear to the second output shaft.

The second speed gear may be engaged with the first input gear and the third speed gear may be engaged with the third input gear.

In another exemplary embodiment, first and second input gears may be fixedly disposed on the first input shaft and a third input gear may be fixedly disposed on the second input shaft.

The torque converting device may be a double pinion planetary gear set, wherein the first rotation element is a planet carrier, the second rotation element is a sun gear, and the third rotation element is a ring gear.

The first speed output unit may include: a first output shaft disposed in parallel with the first and second input shafts; a first output gear fixedly disposed on the first output shaft and outputting torque of the first output shaft; first and fourth speed gears rotatably disposed on the first output shaft; and a first synchronizer selectively connecting the first speed gear or the fourth speed gear to the first output shaft.

The first speed gear may be engaged with the second input gear and the fourth speed gear may be engaged with the third input gear.

The second speed output unit may include: a second output shaft disposed in parallel with the first and second input shafts; a second output gear fixedly disposed on the second output shaft and outputting torque of the second output shaft; second and third speed gears rotatably disposed on the second output shaft; a second synchronizer selectively connecting the second speed gear to the second output shaft; and a third synchronizer selectively connecting the third speed gear to the second output shaft.

The second speed gear may be engaged with the third input gear and the third speed gear may be engaged with the first input gear.

In other exemplary embodiment, the torque converting device may be a single pinion planetary gear set, wherein the first rotation element is a sun gear, the second rotation element is a ring gear, and the third rotation element is a planet carrier.

In other exemplary embodiment, the torque converting device may be a single pinion planetary gear set, wherein the first rotation element is a ring gear, the second rotation element is a sun gear, and the third rotation element is a planet carrier.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of a power transmission apparatus for a vehicle according to the various exemplary embodiments of the present invention.

Figure 1:
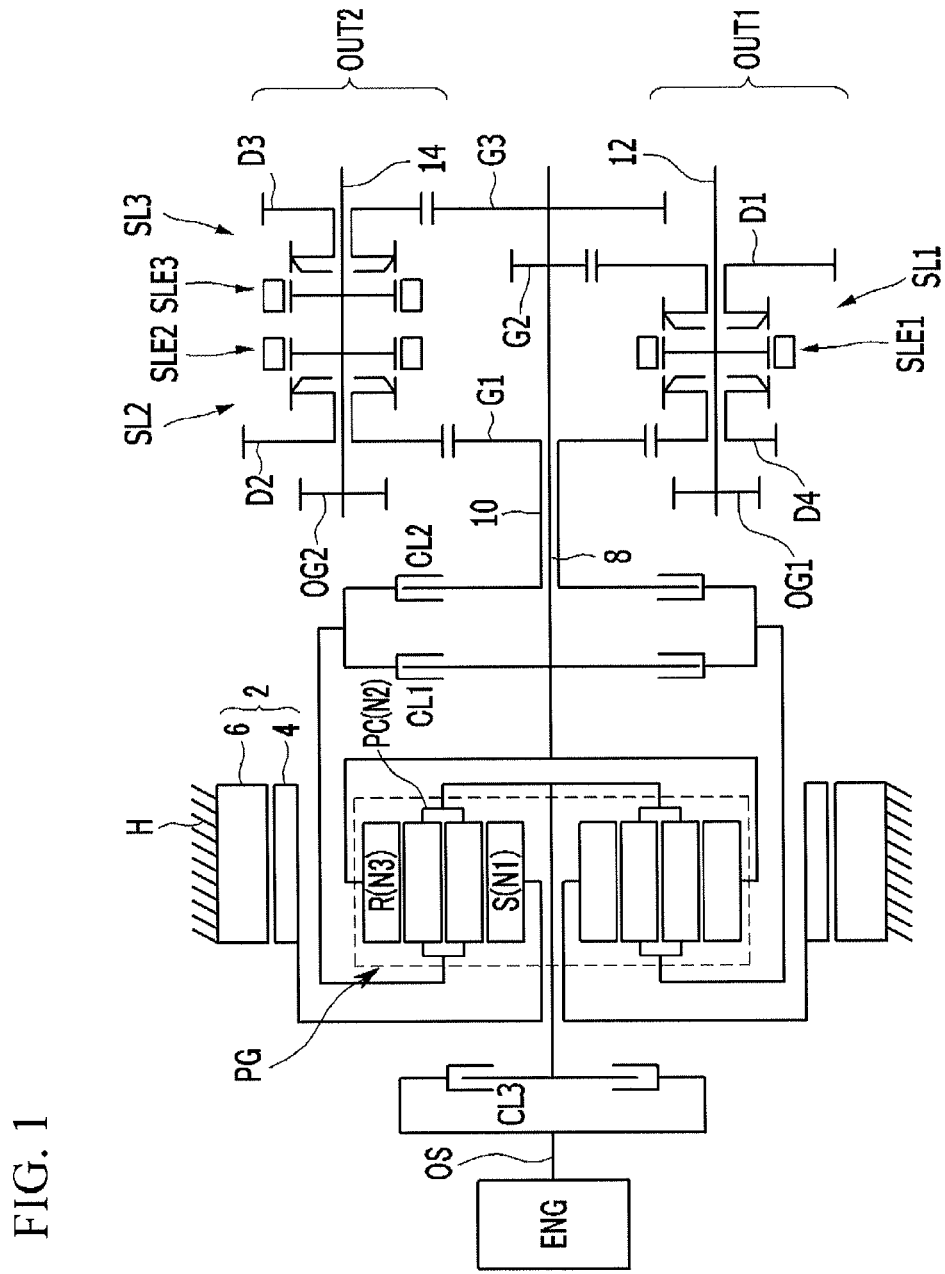
FIG. 1 is a schematic diagram of a power transmission apparatus for a vehicle according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmission apparatus for a vehicle according to the first exemplary embodiment of the present invention.

Referring to FIG. 1, a power transmission apparatus according to a first exemplary embodiment of the present invention includes an engine ENG and a motor/generator 2 that are power sources, a torque converting device, an input device, first and second speed output units OUT1 and OUT2, and a reverse speed unit REOUT.

A typical internal combustion engine may be used as the engine ENG and an output shaft OS of the engine ENG is connected to any one rotation element of the torque converting device.

In addition, the motor/generator 2 includes a rotor 4 and a stator 6 and is operated as a motor or a generator. The rotor 4 is connected to the another rotation element of the torque converting device and the stator 6 is fixed to a transmission housing H.

The torque converting device is a planetary gear set PG, and a double pinion planetary gear set having three rotation elements is used as the torque converting device in the first exemplary embodiment of the present invention.

The three rotation elements include a first rotation element N1 being a sun gear S, a second rotation element N2 being a planet carrier PC, and a third rotation element N3 being a ring gear R.

The sun gear S being the first rotation element N1 is directly connected to the rotor 4 to receive torque of the rotor 4 or to transmit torque to the rotor 4.

The second rotation element N2 is selectively connected to the output shaft OS of the engine ENG that is the power source to be operated as a selective input element and to transmit the torque of the engine ENG to the input device without rotation speed change.

The ring gear R being the third rotation element N3 is operated as an output element transmitting torque to the input device.

Herein, a third clutch CL3 is interposed between the planet carrier PC that is the second rotation element N2 and the output shaft OS of the engine ENG to selectively transmit the torque of the engine ENG to the second rotation element N2.

The input device includes a first input shaft 8 and a second input shaft 10.

One end portion of the first input shaft 8 is selectively connected to the second rotation element N2 selectively connected to the engine ENG and is directly connected to the third rotation element N3.

The second input shaft 10 is a hollow shaft and is disposed at a radial exterior of the first input shaft 8 without rotational interference with the first input shaft 8. One end portion of the second input shaft 10 is selectively connected to the second rotation element N2 selectively connected to the engine ENG.

A first input gear G1 is fixedly disposed on the second input shaft 10 and second and third input gears G2 and G3 are fixedly disposed on the first input shaft 8.

The second and third input gears G2 and G3 are positioned on the other end portion of the first input shaft 8 penetrating through the second input shaft 10 and are sequentially disposed from one end to the other end.

The first, second, and third input gears G1, G2, and G3 are input gears operating at each speed. That is, the first input gear G1 is an input gear for achieving a second forward speed and a fourth forward speed, the second input gear G2 is an input gear for achieving a first forward speed, and the third input gear G3 is an input gear for achieving a third forward speed.

Here, input gears for achieving odd-numbered speeds are disposed on the first input shaft 8, and an input gear for achieving even-numbered speeds is disposed on the second input shaft 10.

In addition, the input device is selectively connected to the torque converting device through the first clutch CL1 and the second clutch CL2, and the torque converting device and the engine ENG are selectively connected through the third clutch CL3.

The first clutch CL1 is disposed between the first input shaft 8 and the second rotation element N2 to direct-couple the planetary gear set PG that is the torque converting device and to transmit rotation speed of the engine ENG to the first input shaft 8.

The second clutch CL2 is disposed between the second input shaft 10 and the second rotation element N2 to transmit rotation speed of the second rotation element N2 to the second input shaft 10.

The third clutch CL3 is disposed between the output shaft OS of the engine ENG and the second rotation element N2 to selectively transmit the torque of the engine ENG to the second rotation element N2.

The first, second, and third clutches CL1, CL2, and CL3 may be conventional multi-plate clutches of wet type and are controlled by a hydraulic control system. The first, second, and third clutches CL1, CL2, and CL3 may be multi-plate clutches of dry type.

The first and second speed output units OUT1 and OUT2 configured to receive torque from each input gear of the input device, convert the torque, and out the converted torque are disposed in parallel with and apart from the first and second input shafts 8 and 10.

The first speed output unit OUT1 includes a first output shaft 12, first and fourth speed gears D1 and D4 rotatably disposed on the first output shaft 12, and a first synchronizer SL1.

The first output shaft 12 is disposed in parallel with and apart from the first and second input shafts 8 and 10.

The first speed gear D1 is engaged with the second input gear G2 and the fourth speed gear D4 is engaged with the first input gear G1.

In addition, the first synchronizer SL1 is disposed on the first output shaft 12 and selectively connects the first speed gear D1 or the fourth speed gear D4 to the first output shaft 12.

In addition, the torque converted by the first speed output unit OUT1 is transmitted to a differential apparatus through a first output gear OG1 fixedly disposed on one end portion or the other end portion of the first output shaft 12.

The second speed output unit OUT2 includes a second output shaft 14, second and third speed gears D2 and D3 rotatably disposed on the second output shaft 14, and second and third synchronizers SL2 and SL3.

The second output shaft 14 is disposed in parallel with and apart from the first and second input shafts 8 and 10.

The second speed gear D2 is engaged with the first input gear G1 and the third speed gear D3 is engaged with the third input gear G3.

The second synchronizer SL2 is disposed on the second output shaft 14 and selectively connects the second speed gear D2 to the second output shaft 14.

The third synchronizer SL3 is disposed on the second output shaft 14 and selectively connects the third speed gear D3 to the second output shaft 14.

In addition, the torque converted through the second speed output unit OUT2 is transmitted to the differential apparatus through a second output gear OG2 fixedly disposed on one end portion or the other end portion of the second output shaft 14.

Since the first, second, and third synchronizers SL1, SL2, and SL3 are well known to a person of an ordinary skill in the art, detailed description thereof will be omitted. In addition, first, second, and third sleeves SLE1, SLE2, and SLE3 applied respectively to the first, second, and third synchronizers SL1, SL2, and SL3, as well known to a person of an ordinary skill in the art, are operated by additional actuators and the actuators are controlled by a transmission control unit.

FIG. 2 is an operational chart of a power transmission apparatus for a vehicle according to the first exemplary embodiment of the present invention.

Referring to FIG. 2, the first clutch CL1 is operated at the reverse speed and the odd-numbered speeds and the second clutch CL2 is operated at the eve-numbered speeds.

[Neutral State]

At a neutral state, the first and second clutches CL1 and CL2 are released, the third clutch CL3 is operated, and the sleeves SLE1, SLE2, and SLE3 of the first to the third synchronizer SL1, SL2, and SL3 are positioned at neutral positions.

At the neutral state, forward starting is possible by operably connecting the first output shaft 12 with the first speed gear D1.

In addition, a battery can be charged at the neutral N state. In this case, the first clutch CL1 is operated to cause the planetary gear set PG to become a direct-coupling state and the third clutch CL3 is operated. Therefore, the torque of the engine ENG is transmitted to the rotor 4 and the motor/generator 2 generates electric energy.

[Reverse Range at EV Mode]

The first output shaft 12 and the first speed gear D1 are operably connected through the sleeve SLE1 of the first synchronizer SL1 at the neutral N state. After that, when the motor/generator is rotated in a negative direction and the first clutch CL1 is operated, reverse range at electric vehicle (EV) mode is achieved.

The engine ENG is stopped in the reverse range at the EV.

[Forward Range at EV Mode]

The first output shaft 12 and the first speed gear D1 are operably connected through the sleeve SLE1 of the first synchronizer SL1 at the neutral N state. After that, when the motor/generator is rotated in a positive direction and the first clutch CL1 is operated, forward range at the EV mode is achieved.

The engine ENG is stopped in the forward range at the EV.

[First Forward Speed]

If the first output shaft 12 and the first speed gear D1 are operably connected through the sleeve SLE1 of the first synchronizer SL1 at the neutral N state, the forward starting by the torque of the engine ENG is possible. When the first clutch CL1 is operated at this state, the first forward speed is achieved.

In addition, the second output shaft 14 and the second speed gear D2 may be operably connected through the sleeve SLE2 of the second synchronizer SL2 for a next shift to the second forward speed.

[Second Forward Speed]

If the second output shaft 14 and the second speed gear D2 are operably connected to the sleeve SLE2 of the second synchronizer SL2, the first clutch CL1 is released, and the second clutch CL2 is operated, the second forward speed is achieved.

At this time, the sleeve SLE1 of the first synchronizer SL1 is moved to the neutral position, and the second output shaft 14 and the third speed gear D3 may be operably connected through the sleeve SLE3 of the third synchronizer SL3 for a next shift to the third forward speed.

[Third Forward Speed]

If the third output shaft 14 and the third speed gear D3 are operably connected through the sleeve SLE3 of the third synchronizer SL3, the second clutch CL2 is released, and the first clutch CL1 is operated, the third forward speed is achieved.

At this time, the sleeve SLE2 of the second synchronizer SL2 is moved to the neutral position, and first output shaft 12 and the fourth speed gear D4 are operably connected through the sleeve SLE1 of the first synchronizer SL1 for a next shift to the fourth forward speed.

[Fourth Forward Speed]

If the first output shaft 12 and the fourth speed gear D4 are operably connected through the sleeve SLE1 of the first synchronizer SL1, the first clutch CL1 is released, and the second clutch CL2 is operated, the fourth forward speed is achieved.

Meanwhile, when the motor/generator 2 is operated in a state that the first clutch CL1 is released, the torque of the motor/generator 2 and the torque of the engine ENG are added at the torque converting device and the added torque is output to the input device.

In addition, when the vehicle runs at forward shift-speed or reverse shift-speed, the regenerative braking is possible through the motor/generator 2.

According to the first exemplary embodiment of the present invention, smooth shifting and starting may be possible by using the engine ENG (or the engine and the motor/generator) and the planetary gear set PG that is the torque converting device.

In addition, slip of the clutches may be minimized and regenerative braking is performed at deceleration. Therefore, fuel economy may be improved.

In addition, when the vehicle accelerates, the torque of the motor/generator 2 is used as auxiliary torque. Therefore, acceleration performance may be improved.

Since the reverse speed can be achieved by rotating the motor/generator inversely, the number of components and length of the transmission may be reduced.

Figure 3:
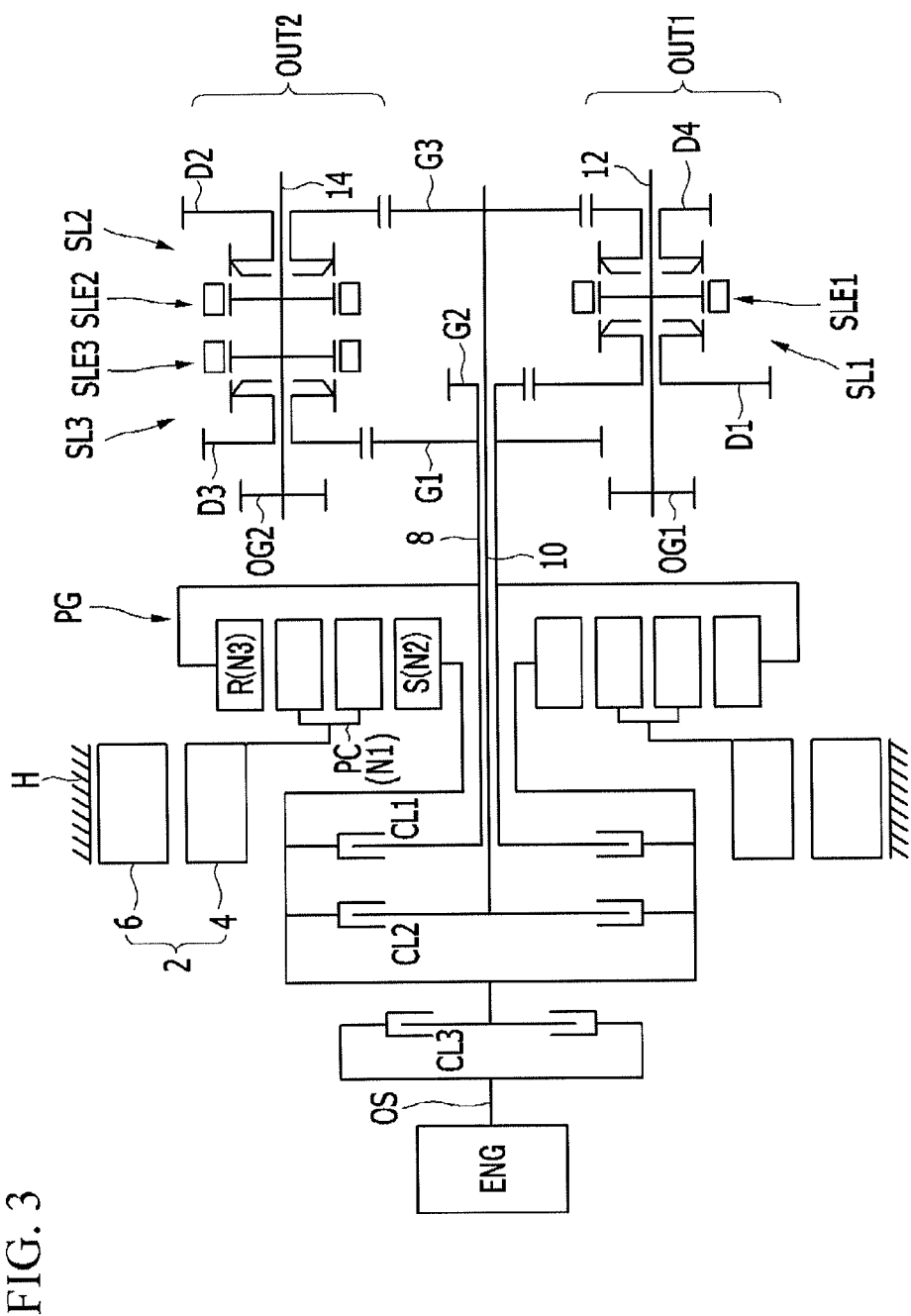
FIG. 3 is a schematic diagram of a power transmission apparatus for a vehicle according to the various exemplary embodiments of the present invention.

FIG. 3 is a schematic diagram of a power transmission apparatus for a vehicle according to the second exemplary embodiment of the present invention.

According to the second exemplary embodiment of the present invention, the first and second input gears G1 and G2 are sequentially disposed on the first input shaft 8 from the one end to the other end, and the third input gear G3 is disposed on the second input shaft 10.

In addition, the first and fourth speed gears D1 and D4 are sequentially disposed on the first output shaft 12 and are engaged respectively with the second and third input gears G2 and G3. The third and second speed gears D3 and D2 are sequentially disposed on the second output shaft 14 and are engaged respectively with the first and third input gears G1 and G3.

In addition, the first rotation element N1 is the planet carrier PC, the second rotation element N2 is the sun gear S, and the third rotation element N3 is the ring gear R in the planetary gear set PG.

At this time, the first clutch CL1 is disposed between the sun gear S and the first input shaft 8 and the second clutch CL2 is disposed between the sun gear S and the second input shaft 10.

Since functions of the second exemplary embodiment of the present invention are the same as those of the first exemplary embodiment except arrangements of the input gears on the first and second input shafts 8 and 10 and speed gears on the first and second output shafts 12 and 14, connections between the input gears and the speed gears, and constituent elements of the planetary gear set PG including the first and second rotation elements N1 and N2, detailed description thereof will be omitted.

Figure 4:
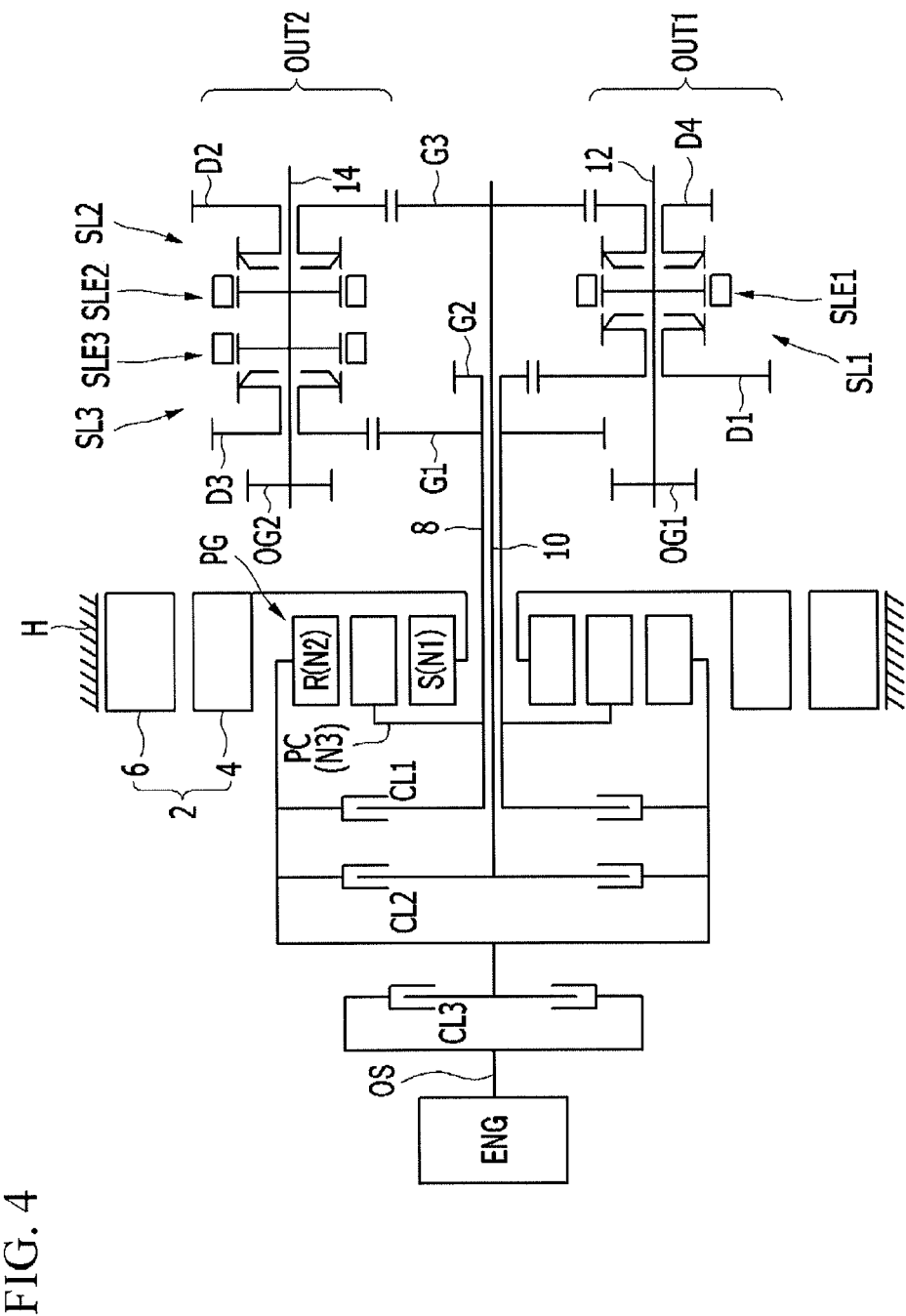
FIG. 4 is a schematic diagram of a power transmission apparatus for a vehicle according to the various exemplary embodiments of the present invention.

FIG. 4 is a schematic diagram of a power transmission apparatus for a vehicle according to the third exemplary embodiment of the present invention.

Referring to FIG. 4, the planetary gear set PG is a single pinion planetary gear set in the third exemplary embodiment.

That is, the first rotation element is the sun gear S, the second rotation element is the ring gear R, and the third rotation element is the planet carrier PC in the third exemplary embodiment.

At this time, the first clutch CL1 is disposed between the ring gear R and the first input shaft 8 and the second clutch CL2 is disposed between the ring gear R and the second input shaft 10.

Since functions of the third exemplary embodiment of the present invention are the same as those of the second exemplary embodiment except constituent elements of the planetary gear set PG including the first, second, and third rotation elements N1, N2, and N3, detailed description thereof will be omitted.

Figure 5:
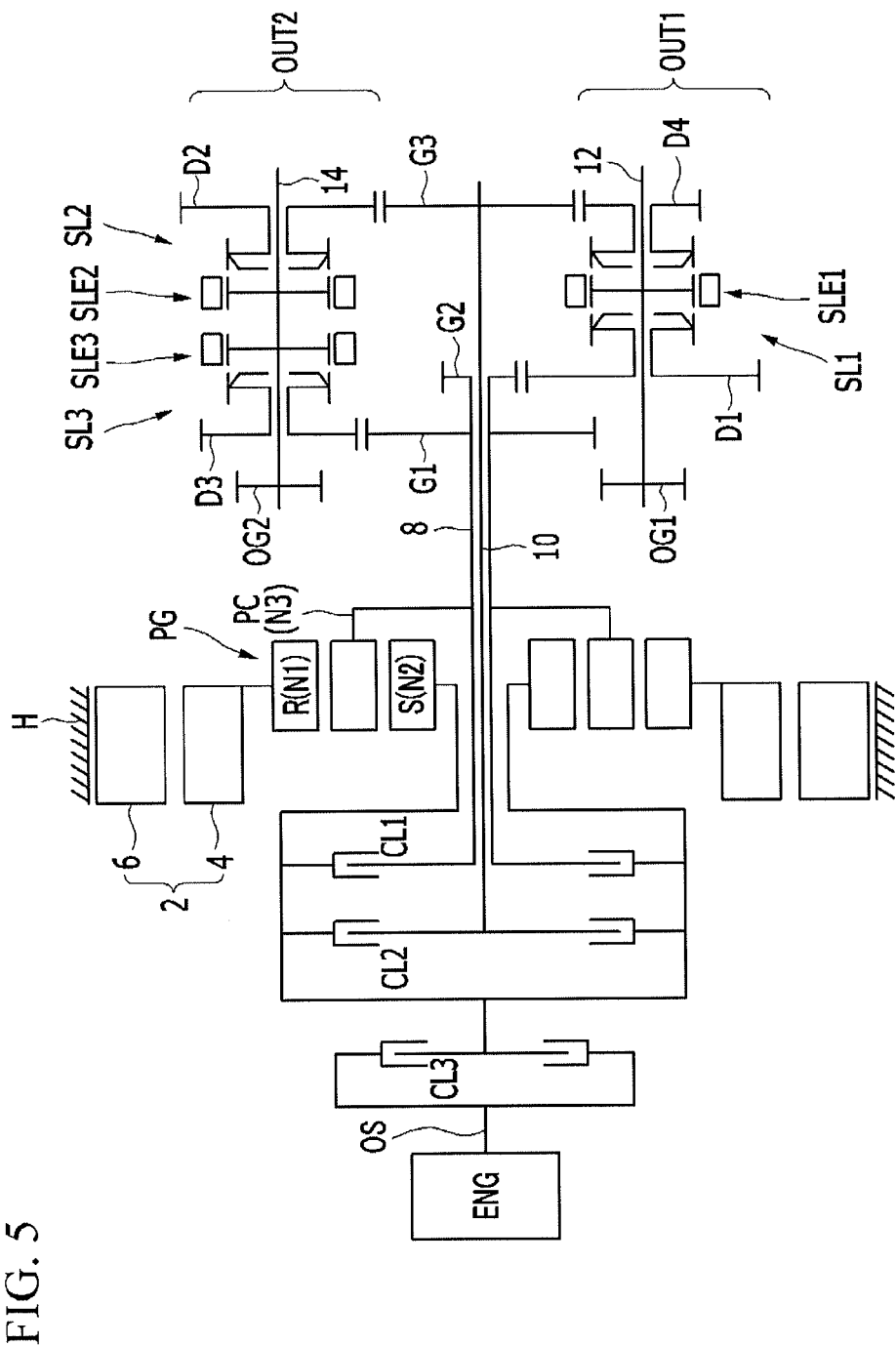
FIG. 5 is a schematic diagram of a power transmission apparatus for a vehicle according to the various exemplary embodiments of the present invention.

FIG. 5 is a schematic diagram of a power transmission apparatus for a vehicle according to the fourth exemplary embodiment of the present invention.

Referring to FIG. 5, the planetary gear set PG is a single pinion planetary gear set in the fourth exemplary embodiment. In addition, the first rotation element is the ring gear R, the second rotation element is the sun gear S, and the third rotation element is the planet carrier PC.

At this time, the first clutch CL1 is disposed between the sun gear S and the first input shaft 8 and the second clutch CL2 is disposed between the sun gear S and the second input shaft 10.

Since functions of the fourth exemplary embodiment of the present invention are the same as those of the third exemplary embodiment except constituent elements of the planetary gear set PG including the first, second, and third rotation elements N1, N2, and N3, detailed description thereof will be omitted.

According to the exemplary embodiments of the present invention, smooth starting and shifting may be achieved by outputting the torques of the engine and the motor/generator through the planetary gear set.

In addition, slip of the clutches may be minimized and regenerative braking is performed at deceleration. Therefore, fuel economy may be improved.

Since the torque of the motor/generator is used as auxiliary torque when the vehicle accelerates, acceleration performance may be improved.

Since the reverse speed can be achieved by rotating the motor/generator inversely, the number of components and length of the transmission may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof It is intended that the scope of the invention be defined by the Claims appended hereto and their equivalents.

What is claimed is:

1. A power transmission apparatus for a vehicle comprising:
   a torque converting device including:
   a first rotation element directly connected to one power source;
   a second rotation element selectively connected to another power source; and
   a third rotation element;
   an input device including:
   a first input shaft directly connected to the third rotation element, selectively connected to the second rotation element, and provided with at least one input gear fixedly disposed on an exterior circumference thereof; and
   a second input shaft disposed without rotational interference with the first input shaft, selectively connected to the second rotation element, and provided with at least one input gear fixedly disposed on an exterior circumference thereof;
   a first speed output unit configured to convert toque input from the first input shaft or the second input shaft and output a converted torque; and
   a second speed output unit configured to convert torque input from the first input shaft or the second input shaft and output a converted torque.

2. The power transmission apparatus of claim 1, wherein the one power source is a motor/generator and the another power source is an engine.

3. The power transmission apparatus of claim 2, wherein the motor/generator comprises:
   a stator fixed to a transmission housing; and
   a rotor rotatably disposed in the stator and directly connected to the first rotation element.

4. The power transmission apparatus of claim 3, further comprising:
   a first clutch disposed between the second rotation element and the first input shaft; and
   a second clutch disposed between the second rotation element and the second input shaft.

5. The power transmission apparatus of claim 4, further comprising a third clutch disposed between the engine and the second rotation element.

6. The power transmission apparatus of claim 1, wherein a first input gear is fixedly disposed on the second input shaft, and
   second and third input gears are fixedly disposed on the first input shaft.

7. The power transmission apparatus of claim 6, wherein the torque converting device is a double pinion planetary gear set, wherein the first rotation element is a sun gear, the second rotation element is a planet carrier, and the third rotation element is a ring gear.

8. The power transmission apparatus of claim 6, wherein the first speed output unit comprises:
   a first output shaft disposed in parallel with the first and second input shafts;
   a first output gear fixedly disposed on the first output shaft and outputting torque of the first output shaft;
   first and fourth speed gears rotatably disposed on the first output shaft; and
   a first synchronizer selectively connecting the first speed gear or the fourth speed gear to the first output shaft.

9. The power transmission apparatus of claim 8, wherein the first speed gear is engaged with the second input gear and the fourth speed gear is engaged with the first input gear.

10. The power transmission apparatus of claim 8, wherein the second speed output unit comprises:
    a second output shaft disposed in parallel with the first and second input shafts;
    a second output gear fixedly disposed on the second output shaft and outputting torque of the second output shaft;

second and third speed gears rotatably disposed on the second output shaft;
a second synchronizer selectively connecting the second speed gear to the second output shaft; and
a third synchronizer selectively connecting the third speed gear to the second output shaft.

11. The power transmission apparatus of claim 10, wherein the second speed gear is engaged with the first input gear and the third speed gear is engaged with the third input gear.

12. The power transmission apparatus of claim 1, wherein first and second input gears are fixedly disposed on the first input shaft, and
a third input gear is fixedly disposed on the second input shaft.

13. The power transmission apparatus of claim 12, wherein the torque converting device is a double pinion planetary gear set, wherein the first rotation element is a planet carrier, the second rotation element is a sun gear, and the third rotation element is a ring gear.

14. The power transmission apparatus of claim 12, wherein the first speed output unit comprises:
a first output shaft disposed in parallel with the first and second input shafts;
a first output gear fixedly disposed on the first output shaft and outputting torque of the first output shaft;
first and fourth speed gears rotatably disposed on the first output shaft; and
a first synchronizer selectively connecting the first speed gear or the fourth speed gear to the first output shaft.

15. The power transmission apparatus of claim 14, wherein the first speed gear is engaged with the second input gear and the fourth speed gear is engaged with the third input gear.

16. The power transmission apparatus of claim 14, wherein the second speed output unit comprises:
a second output shaft disposed in parallel with the first and second input shafts;
a second output gear fixedly disposed on the second output shaft and outputting torque of the second output shaft;
second and third speed gears rotatably disposed on the second output shaft;
a second synchronizer selectively connecting the second speed gear to the second output shaft; and
a third synchronizer selectively connecting the third speed gear to the second output shaft.

17. The power transmission apparatus of claim 16, wherein the second speed gear is engaged with the third input gear and the third speed gear is engaged with the first input gear.

18. The power transmission apparatus of claim 12, wherein the torque converting device is a single pinion planetary gear set, wherein the first rotation element is a sun gear, the second rotation element is a ring gear, and the third rotation element is a planet carrier.

19. The power transmission apparatus of claim 12, wherein the torque converting device is a single pinion planetary gear set, wherein the first rotation element is a ring gear, the second rotation element is a sun gear, and the third rotation element is a planet carrier.

* * * * *